UNITED STATES PATENT OFFICE.

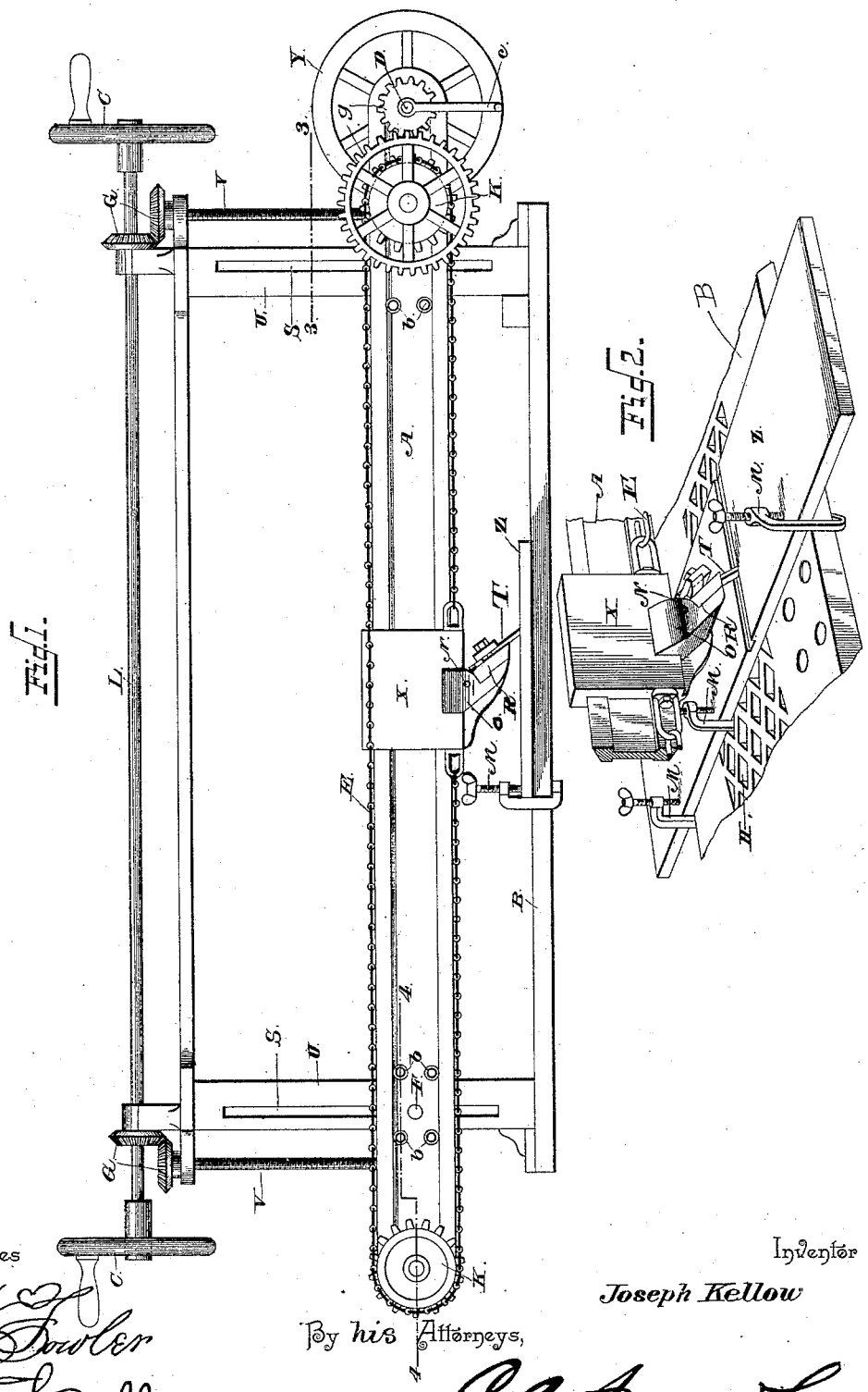

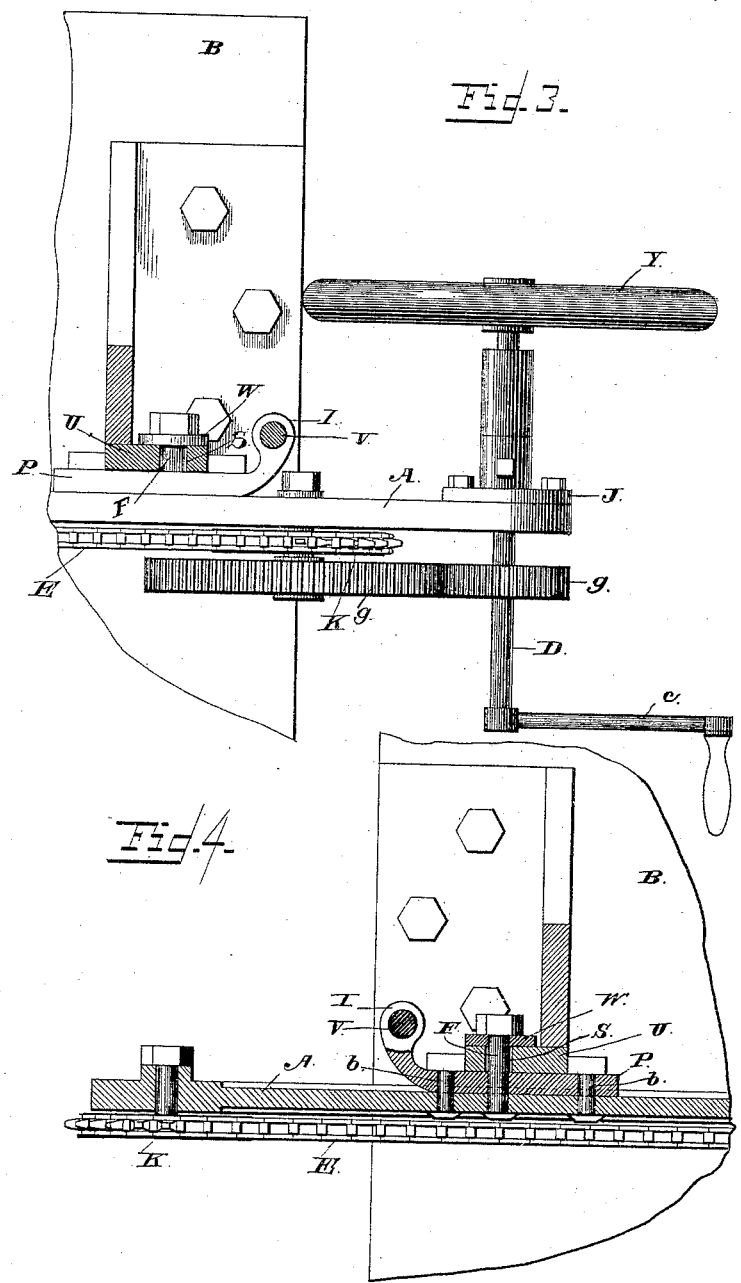

JOSEPH KELLOW, OF BROOKLYN, NEW YORK.

STONE-DRESSING MACHINE.

SPECIFICATION forming part of Letters Patent No. 445,644, dated February 3, 1891.

Application filed July 9, 1890. Serial No. 358,154. (No model.)

*To all whom it may concern:*

Be it known that I, JOSEPH KELLOW, a citizen of the United States, residing at Brooklyn, in the county of Kings and State of New York, have invented a new and useful Stone-Dressing Machine, of which the following is a specification.

This invention relates to stone-working, and more especially to the machines for dressing stone; and the object of the same is to effect improvements upon machines of this same general character heretofore existing.

To this end the invention consists in the specific details of novelty hereinafter more fully described, and illustrated in the drawings, in which—

Figure 1 is a front elevation of this improved machine. Fig. 2 is a perspective view of a portion of the base with a stone slab clamped thereon. Fig. 3 is a section on the line 3 3, and Fig. 4 a section on the line 4 4, of Fig. 1.

Referring to the accompanying drawings, B is the base, which is of metal, having a number of holes H therethrough, and U are uprights rising from the base near each end thereof and preferably connected at their upper ends. A is a horizontal beam, which extends beyond said uprights at the ends of the machine, as shown in Fig. 1. This beam is preferably of I-shaped cross-section, and against its rear face, between its flanges at each end, a plate P is clamped by bolts $b$, which pass through the beams, as seen in Fig. 4, the nuts of these bolts standing against each side of the upright U. Between these bolts a third or fastening bolt F passes through the web of the beam A, through the plate P, through a slot S in the upright, and through a washer W, which is clamped against the rear side of the beam, as shown. The bolts $b$ are prevented from unscrewing by contact with the sides of the upright, and the washer W beneath the nut of the bolt F slides against the rear face of the upright.

Journaled in suitable bearings at the upper ends of the uprights is a longitudinal shaft L, having hand wheels or cranks C upon its ends, and journaled in suitable bearings outside each upright is a vertical screw V, which is connected by intermeshing gears G with the shaft L. This screw passes through an eye I in one end of the plate P, as seen in Fig. 4, whereby when the shaft L is turned by the cranks C the beam may be raised and lowered, as will be readily understood.

Sliding longitudinally upon the beam A is a box X, connected with an endless chain E, which passes over sprocket-wheels K, mounted upon stub-shafts at the ends of the arm.

D is the driving-shaft, which is journaled through one end of the beam and preferably has a fly-wheel Y on one end, the other end having a crank $c$ or being driven from any suitable source of power. In order to better support the fly-wheel, the driving-shaft D is journaled in an extra bearing J, connected to the rear side of the beam A, as seen in Fig. 3. Intermeshing gears $g$ communicate motion from the driving-shaft to the adjacent sprocket-wheel K, whereby when the driving-shaft is turned the box X will be moved longitudinally of the beam A. This box is thus given a longitudinal motion, while it may be raised and lowered by turning either of the cranks C.

The base B, as above stated, is provided with holes H, and when the slab Z is laid upon the base, clamps M are inserted through these holes, as shown in Fig. 2, and their screws tightened to retain the slab in place.

T is the cutting-tool, which may be of any preferred construction, adapted for grooving, cutting, or dressing stone.

O is a lug projecting outwardly from the box X and having an inclined rear face R, and pivoted in this lug on a pin N above said rear face is the upper end of the tool T.

When the tool is moved forwardly over the slab, its cutting-edge operates upon the same; but upon a return movement it turns bodily upon the pin N and drags across the stone. The operator then gives a slight turn to one of the cranks C, whereby the arm, the box, and the tool are slightly depressed, and when the tool next travels across the stone a slightly-deeper cut is made.

What I claim is—

1. In a stone-dressing machine, the combination, with the base B and the vertical uprights U, provided with longitudinal slots S, of the beam A, the plates P, the bolts $b$, clamping the plate $g$ against the beam, and the fastening-bolt F between said bolts $b$, passing through the beam, the plate, the slot in one upright, and through a washer W, sliding against the rear face of said upright, substantially as described.

2. In a stone-dressing machine, the combination, with the base B, the vertical uprights U, provided with longitudinal slots S, and the vertical screws V, adjacent to said uprights, of the beam A, the plates P, each having a threaded eye I in one end engaging one of said screws, the bolts $b$ through each of said plates near its ends clamping it against the beam, and the fastening-bolt F between said bolts $b$, passing through the beam, the plate, the slot in one upright, and through a washer W, sliding against the rear face of said upright, substantially as hereinbefore described.

In testimony that I claim the foregoing as my own I have hereto affixed my signature in presence of two witnesses.

JOSEPH KELLOW.

Witnesses:
B. R. SPELMAN, Jr.,
G. W. PALMER.